(12) United States Patent
Bernardi et al.

(10) Patent No.: US 11,830,526 B2
(45) Date of Patent: Nov. 28, 2023

(54) SELECTING SUPPLEMENTAL AUDIO SEGMENTS BASED ON VIDEO ANALYSIS

(71) Applicant: XDMIND INC., Mercer Island, WA (US)

(72) Inventors: Linda Bernardi, Mercer Island, WA (US); Ara Bernardi, Mercer Island, WA (US)

(73) Assignee: XDMIND INC., Mercer Island, WA (US)

( * ) Notice: Subject to any disclaimer, the term of this patent is extended or adjusted under 35 U.S.C. 154(b) by 0 days.

(21) Appl. No.: 17/804,283

(22) Filed: May 26, 2022

(65) Prior Publication Data

US 2022/0385967 A1  Dec. 1, 2022

Related U.S. Application Data

(60) Provisional application No. 63/266,498, filed on Jan. 6, 2022, provisional application No. 63/202,100, filed on May 27, 2021, provisional application No. 63/202,102, filed on May 27, 2021.

(51) Int. Cl.
*G06V 20/40* (2022.01)
*G11B 27/031* (2006.01)
*G11B 27/00* (2006.01)
*H04N 21/431* (2011.01)
*H04N 21/81* (2011.01)

(52) U.S. Cl.
CPC ........... *G11B 27/031* (2013.01); *G06V 20/41* (2022.01); *G06V 20/46* (2022.01); *G11B 27/005* (2013.01); *H04N 21/4316* (2013.01); *H04N 21/812* (2013.01); *H04N 21/816* (2013.01); *H04N 21/8113* (2013.01)

(58) Field of Classification Search
CPC ...................................................... G06V 20/46
See application file for complete search history.

(56) References Cited

U.S. PATENT DOCUMENTS

| | | | |
|---|---|---|---|
| 2010/0303290 A1* | 12/2010 | Mathe | G06T 17/05 382/103 |
| 2018/0226063 A1 | 8/2018 | Wood et al. | |
| 2020/0188790 A1* | 6/2020 | Galuten | G11B 27/031 |
| 2020/0236278 A1* | 7/2020 | Yeung | H04N 21/2187 |
| 2021/0020149 A1* | 1/2021 | Li | G11B 27/28 |

OTHER PUBLICATIONS

International Search Report and Written Opinion, dated Oct. 19, 2022, issued in International Application No. PCT/US2022/031209.

* cited by examiner

*Primary Examiner* — Michael H Hong
(74) *Attorney, Agent, or Firm* — Knobbe Martens Olson & Bear LLP

(57) ABSTRACT

Aspects of the present application correspond to generation of supplemental content based on processing information associated with content to be rendered. More specifically, aspects of the present application correspond to the generation of audio track information, such as music tracks, that are created for playback during the presentation of video content. Illustratively, one or more frames of the video content are processed by machine learned algorithm(s) to generate processing results indicative of one or more attributes characterizing individual frames of video content. A selection system can then identify potential music track or other audio data in view of the processing results.

24 Claims, 5 Drawing Sheets

SELECTING SUPPLEMENTAL AUDIO SEGMENTS BASED ON VIDEO ANALYSIS

CROSS-REFERENCE TO RELATED APPLICATION

This application claims the benefit of U.S. Provisional Application No. 63/202,102, entitled DYNAMIC MODIFICATION OF CONTENT, and filed on May 27, 2021, U.S. Provisional Application No. 63/202,100 entitled ENGAGEMENT PLATFORM, and filed on May 27, 2021, and U.S. Provisional Application No. 63/266,498, entitled DYNAMIC MODIFICATION OF CONTENT, and filed on Jan. 6, 2022. U.S. Provisional Applications Nos. 63/202,102; 63/202,100 and 63/266,498 are incorporated by reference herein.

BACKGROUND

Generally described, computing devices and communication networks can be utilized to exchange data or information. In a common application, a computing device can request content from another computing device via the communication network. For example, a client having access to a computing device can utilize a software application to request content from a server computing device via the network (e.g., the Internet). In such embodiments, the client's computing device can be referred to as a client computing device, and the server computing device can be referred to as an original content provider.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
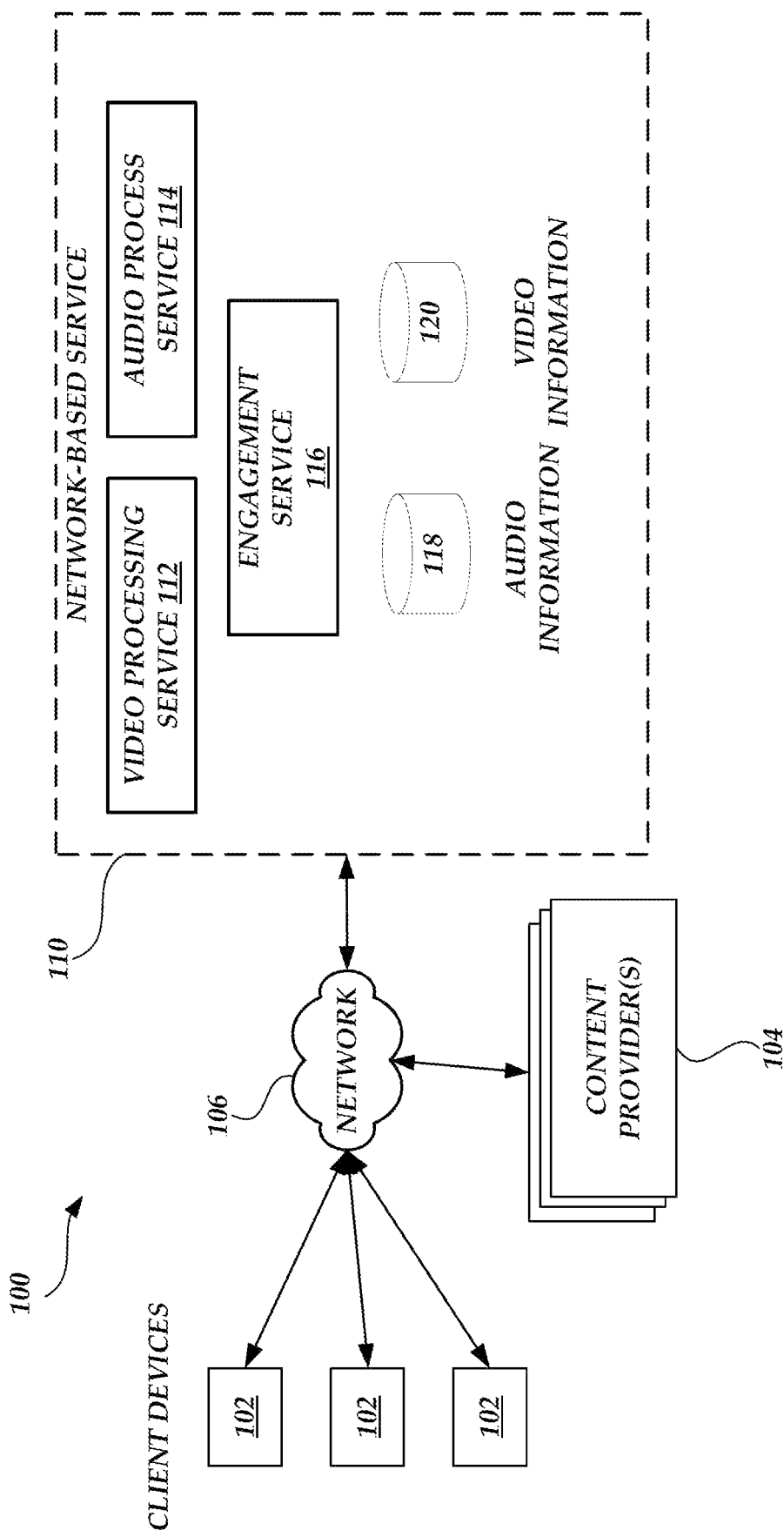
FIG. 1 is a block diagram of a content delivery environment that includes one or more client computing devices, content providers and a network service.

Generally described, aspects of the present application correspond to generation of supplemental content based on processing information associated with content to be rendered. More specifically, aspects of the present application correspond to the generation of audio track information, such as music tracks, that are created for playback during the presentation of video content. Illustratively, one or more frames of the video content are processed by machine learned algorithm(s) to generate processing results indicative of one or more attributes characterizing individual frames of video content. A selection system can then identify potential music track or other audio data in view of the processing results.

Illustratively, aspects of the present application may be implemented for the processing of video game content generated on a computing device. Aspects of the present application may also be implemented for the processing of video content generated by mobile applications, such as social media application. Still further, aspects of the present application may be implemented for the processing of video content generated by other multi-media or playback application, such as in a personal computing device, mobile device, and the like. Accordingly, reference to video content in general should not be construed as limited to any specific type of video content or video content generating application.

Generally described, traditional video processing approaches rely on individual object detection or instrumented attributes provided by the video game developer. For example, a content system may be able to process video content to identify individual objects that are be rendered and select supplemental content, such as advertising content. In another example, a game developer may provide meta-data or other descriptive data that accompanies the display content and can be processed. In such applications, the game developer may explicitly identify various attributes such as mood, feelings, activities, etc. However, such descriptions are only actionable when the intent is premeditated by the game developer, and an agent exposes these attributes to a client that can take appropriate actions based on these attributes.

Based on the above described implementations, traditional approaches for supplemental content preparation generally require explicit cooperation between the content generator (e.g., a game developer or mobile application developer) to facilitate functionality. For example, a content provider may allow for the modification of the executable code, such as via incorporate of a customized module or a plugin. Such modifications allow the application to disseminate attributes through an API or various queries.

Such approaches may be generally referred to as coupled approach between the supplemental content generation application and the underlying video content generation application (e.g., game application). For example, a module that can receive meta-data from a video game may require modification of the video game (e.g., content generation application) in order to gain access to the necessary meta-data. Similarly, a module that utilizes API-based communication to process instrumented data will require configuration for each individual video game application. This approach can become inefficient for an application that may be configured to be applicable for use with multiple gaming applications. Similarly, a coupled approach may also be further inefficient if an application, such as gaming application or social media application, may function differently when executed in a different operating environment.

One or more aspects of the present application correspond to a decoupled approach in which a supplemental content application can be executed in parallel and independently from an identified content generating application, or set of content generating applications. The supplemental content application is illustratively configured with one or more machine learned algorithms that correspond to a deep offline analysis of video data, such as video frames of social media applications, mobile device games, and the like. More specifically, in one embodiment related to video gaming content, the deep offline analysis can correspond to machine learned algorithms that have been trained to process individual frames generated by the video game. The processing result correspond to the identification of a set of attributes that characterize a current state of the video game content (or other video content). Such attributes can include mood, theme, character in play, reference objects, rhythm, frequency measures, rate of play, skill of play, and the like. Illustratively, a video analysis application may be configured for a plurality of video game content, e.g., a machine learned algorithm configured for each individual video game application. Such machine learned algorithms may be generically applicable for a group of individuals. In other embodiments, the machine learned algorithms may be customizable for individual users or subsets of users.

In another embodiment related to non-video gaming content, the deep offline analysis can correspond to machine learned algorithms that have been trained to process individual frames generated by the content generating application. By way of non-limiting examples, the machine learning algorithms can incorporate different learning models, including, but not limited to, a supervised learning model, an unsupervised learning model, a reinforcement learning model or a featured learning model. Depending on the type of learning model adopted by the machine learning algorithm, the configuration for processing video or audio data may vary (e.g., using a training set for a supervised or semi-supervised learning model). In other embodiments, the machine learning algorithm can implement a reinforcement-based learning model that implements a penalty/reward model determined by a network service (e.g., an offline process).

The processing result correspond to the identification of a set of attributes that characterize a current state of the video frames (or other video content). Such attributes can include mood, theme, reference objects, rhythm, frequency measures, and the like. Illustratively, a video analysis application may be configured for a plurality of video generating application content, e.g., a machine learned algorithm configured for each individual video game application. Such machine learned algorithms may be generically applicable for a group of individuals. In other embodiments, the machine learned algorithms may be customizable for individual users or subsets of users.

The machine learned algorithm can then be executed utilizing individual video frames to generate processing results from the machine learned algorithm. The processing results can be then processed to make intelligent decisions to influence supplemental content (e.g., song selection) and the adaptation of a song to the current processing result of the video content. Such adaptions can include selection among variations of a song, selection of playback speed, configuring combination of songs, identifying fade in or fade out rates, and the like. In some embodiments, the selection of the supplemental content may be provided by a separate application. This separate application may utilize additional machine learned algorithms that utilize the processing result from the analysis of characteristics of the captured video data. Such separate applications may be configured with user profile information or otherwise customized to individual preferences.

In illustrative embodiments, aspects of the video analysis application can further include analysis of frames of video content using machine learning algorithms to discover levels (analogous to chapters) and summarize video content at an actionable level of detail. In one example, the actionable level of detail can include levels of play for a video game content. In another example, the actional level of detail can include defined milestones or achievements depicted in the video content. Analysis would include game visuals (graphics) and game audio. The result of the analysis would be several dozen (more or less) scene summaries each with a unique set of attributes. As will be described below, the processing of the video frame data can include mapping any captured frame from the video analyses to one of these summary scenes. In a sense, as applicable, in some embodiment, the resulting templates/maps would be equivalent to a sketch book that describes the game story and the high-level game play.

The video analysis application can leverage various video-capture technologies to capture a few frames of a video per second, extract set of features in each frame group (optionally using CNN), and finally build a hierarchical similarity cluster (ex HDBSCAN) across all frame groups. In conjunction to the video capture, audio analysis will provide an additional orthogonal set of features based on how the original music was used to express moods and such. To remedy the problem of audio-FX being mixed with the background music, the audio-FX would be muted by either in-game settings, or by using appropriate signal processing technics to separate music from audio-FX, where typically music is repetitive with a long internal cycles whereas audio-FXs are sudden with an impulse like characteristics in the frequency domain.

In some embodiments, in addition to characterization of action, the video analysis application can also characterize health of characters, pace of play, style of play (e.g., aggressive, conservative, etc.), and intent of game play (e.g., high score, level of play, general play, etc.). In this regard, the machine learned algorithm may be trained in a manner that allows for the processing of individual frames of data to generate the resulting characterizations. Accordingly, each individual game may have different configurations (e.g., machine learned algorithms) based on the visual outputs generated by each game. Illustratively, the processing result can include these attributes for use in the selection of supplemental content.

In sill other embodiments, the video game content may not necessarily include character play. The video analysis application can provide processing results identifying mood or theme as described above. Additionally, the video analysis application can also identify objects in the video game content that can provide references points. For example, a word game application may have a puzzle board as a display object that can be processed for characterizing play of the word game application. In another example, a drawing application may include drawing tools or a "canvas" as display objects. As described above, in some application, the processing results can be based on display attributes (e.g., color, changes in appearance, fonts, location, etc.) that correspond to inputs for supplemental content selection (e.g., frequency, adaptation attributes, pace, etc.).

Still further, in some embodiment, the video analysis application can also be trained to filter or ignore aspects of the video feed. For example, a gaming application may have a core set of display objects for game play that are combined with background images or display objects. The background images or display objects may be dynamically changed, such as according to level of play or to correspond to periodic updates for the game (e.g., a holiday version). The machine learned algorithms can be trained illustratively so that the impact of dynamic display objects in the generation of processing results are ignored or reduced.

Then, during the live gameplay, the video analysis application will grab or capture individual frames of the video content. The frequency of the video content received can vary based on intervals such as once every second. Each individual frame that is captured and selected for further analysis can be mapped. As described above, the mapping can correspond to a processing result from a machine learned algorithm.

Illustratively, at least a portion of the training and configuration of the application maybe take place offline in a remote data center, or in our development center where we would provide APIs to certain components that run on a computing device or a similar but a limited set on the android device of a game player, with the goal to strike the right balance between limiting the amount of processing required locally on one hand, vs minimizing any delays or lags.

Although aspects of the present disclosure will be described with regard to illustrative network components, interactions, and routines, one skilled in the relevant art will appreciate that one or more aspects of the present disclosure may be implemented in accordance with various environments, system architectures, external computing device architectures, and the like. Similarly, references to specific devices, such as a client computing device, can be considered to be general references and not intended to provide additional meaning or configurations for individual external computing devices. Additionally, the examples are intended to be illustrative in nature and should not be construed as limiting.

FIG. 1 is a block diagram of a network environment 100 that includes one or more devices associated with customer/clients that can consume video content, one or more devices associated with content providers, and a service provider for processing or configuring machine learned algorithms for processing video content according to one or more embodiments. The environment 100 includes a plurality of devices 102 utilized by clients or customer, generally referred to as client devices 102, to access video content application(s). Client devices 102 may include any number of different computing devices capable of communicating with the network 106, via a direct connection or via an intermediary. For example, individual accessing computing devices may correspond to a laptop or tablet computer, personal computer, wearable computer, server, personal digital assistant (PDA), hybrid PDA/mobile phone, electronic book reader, set-top box, camera, appliance (e.g. a thermostat or refrigerator), controller, digital media player, watch, glasses, a home or car device, Internet of Thing ("IoT") devices, virtual reality or augmented reality devices, and the like.

Each computer device 102 may optionally include one or more data stores (not shown in FIG. 1) including various applications or computer-executable instructions, such as web browsers or media player software applications, used to implement the embodiments disclosed herein, namely, as video content generating applications(s). As will be explained in greater detail below, the client computing devices 102 will further include a decoupled supplemental content generation application that will allow for the selection and generation of audio segments based on processing video frames generated by the content generating application. Illustrative components of a client devices 102 will be described with regard to FIG. 2.

The environment 100 includes a plurality of devices 104 or network of devices utilized by individual content providers, generally referred to as content provider applications 104, to submit third-party video or audio content as used herein. The content provider applications 104, may include any number of different computing devices capable of communicating with the network 106, via a direct connection or via an intermediary. For example, individual accessing computing devices may correspond to a laptop or tablet computer, personal computer, wearable computer, server, personal digital assistant (PDA), hybrid PDA/mobile phone, mobile phone, Internet of Thing ("IoT") devices, virtual reality or augmented reality devices, and the like. Each content provider applications 104 may optionally include one or more data stores (not shown in FIG. 1) including various applications or computer-executable instructions, such as web browsers or media player software applications, used to implement the embodiments disclosed herein. As will be explained in greater detail below, the applications can be configured to process encoded content segments organized according to fragments and chunks.

Network 106 may be any wired network, wireless network, or combination thereof. In addition, the network 106 may be a personal area network, local area network, wide area network, cable network, fiber network, satellite network, cellular telephone network, data network, or combination thereof. In the example environment of FIG. 1, network 106 is a global area network (GAN), such as the Internet. Protocols and components for communicating via the other aforementioned types of communication networks are well known to those skilled in the art of computer communications and thus, need not be described in more detail herein. While each of the client devices 102, the content provider applications 104, and the network service 110 are depicted as having a single connection to the network 106, individual components of the client devices 102, the content provider applications 104, and the network service 110 may be connected to the network 106 at disparate points. Accordingly, communication times and capabilities may vary between the components of FIG. 1. Likewise, although FIG. 1 is illustrated as having a single network 106, one skilled in the relevant art will appreciate that the environment 100 may utilize any number or combination of networks.

In accordance with embodiments, the network service 110 includes one or more servers for receiving content from the client devices 102 and jo and for processing the content to one or more audio segment recommendations as described herein. As described in further detail below, the network service 110 includes a video processing service 112, an audio process service 114, and an engagement service 116. The video processing service 112 includes illustrative components for configuring of one or more machine learning models to analyze video content and generate attributes of vectors characterizing information depicted in capture video frame data. The audio processing service 114 includes illustrative components for configuring of one or more machine learning models to analyze audio content and generate attributes of vectors characterizing audio data as processing results or for further processing as described herein. The engagement service 116 can correspond to algorithms for providing reconciliation or attribution for video or audio data utilized in accordance with different embodiments herein. Although the various services 112-116 associated with the network service 110 are illustrated as single components, each individual service 112-116 may be implemented in a number of different instantiated components, including virtualized resources. For example, the recommendation service 116 may correspond to a plurality of devices or virtual machine instances that are configured to implement different types of recommendations.

The network service 110 further can include a number of data stores for maintaining different information. The data stores include a video processing information data store 118 for maintaining configuration information, machine learned models, training data, and the like. The data stores also include an audio processing information data store 120 for maintaining configuration information, machine learned models, training data, and the like. Although illustrated as individual data stores, the data stores 116, 118, and 120 can correspond to multiple data stores, distributed data stores, or variations thereof.

It will be appreciated by those skilled in the art that the environment 100 may have fewer or greater components than are illustrated in FIG. 1. Thus, the depiction of the environment 100 in FIG. 1 should be taken as illustrative. For example, in some embodiments, components of the network service 110 may be executed by one more virtual machines implemented in a hosted computing environment. A hosted computing environment may include one or more rapidly provisioned and released computing resources, which computing resources may include computing, networking or storage devices. Additionally, while such components are illustrated as logically being logically grouped in FIG. 1, one skilled in the relevant art will appreciate that one or more aspects of the present application can include the network service 110 as being implemented in multiple geographic areas. Additionally, not all geographic areas hosting portions of the network service 110 will necessary have all the same components or combination of components.

Figure 2:
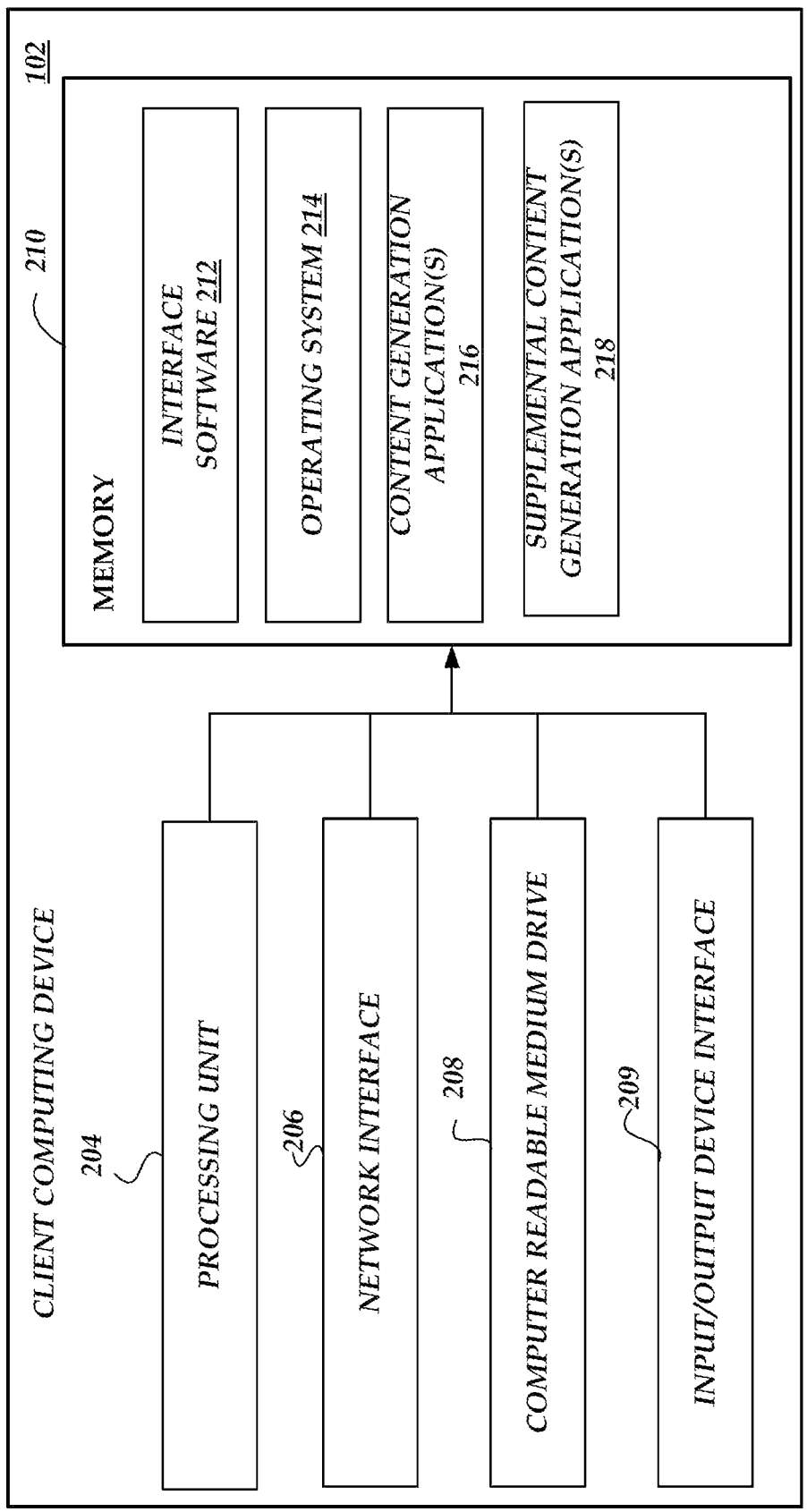
FIG. 2 is a block diagram of illustrative components of a client computing configured with content generation applications and supplemental content generation application that are configured in a decoupled embodiment.

FIG. 2 depicts one embodiment of an architecture of an illustrative client computing device 102, such as a personal computer, tablet computer, smartphone, or other device, that can generate content requests and process content requests in accordance with the present application. The general architecture of the client device 102 depicted in FIG. 2 includes an arrangement of computer hardware and software components that may be used to implement aspects of the present disclosure. As illustrated, the client device 102 includes a processing unit 204, a network interface 206, a computer readable medium drive 208, an input/output device interface 209, an optional display 202, and an input device 224, all of which may communicate with one another by way of a communication bus. In various embodiments, components such as the display 202 and/or the input device 224 may be integrated into the client device 102, or they may be external components that are coupled to the device 102.

The network interface 206 may provide connectivity to one or more networks or computing systems, such as the network 106 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 209 may also accept input from the optional input device 224, such as a keyboard, mouse, digital pen, etc. In some embodiments, the client device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the client device 102. The memory 210 may further include computer program instructions and other information for implementing aspects of the present disclosure. For example, in one embodiment, the memory 210 includes one or more content generating applications 216, such as browser application, mobile applications, video gamping application, and the like, for accessing and generating video content. Additionally, the memory 210 includes at least on supplemental content application 218 for capturing video frame data, processing (or causing to be processed) the video frame data, and selecting (or causing to be selected) supplemental audio data.

Figure 3:
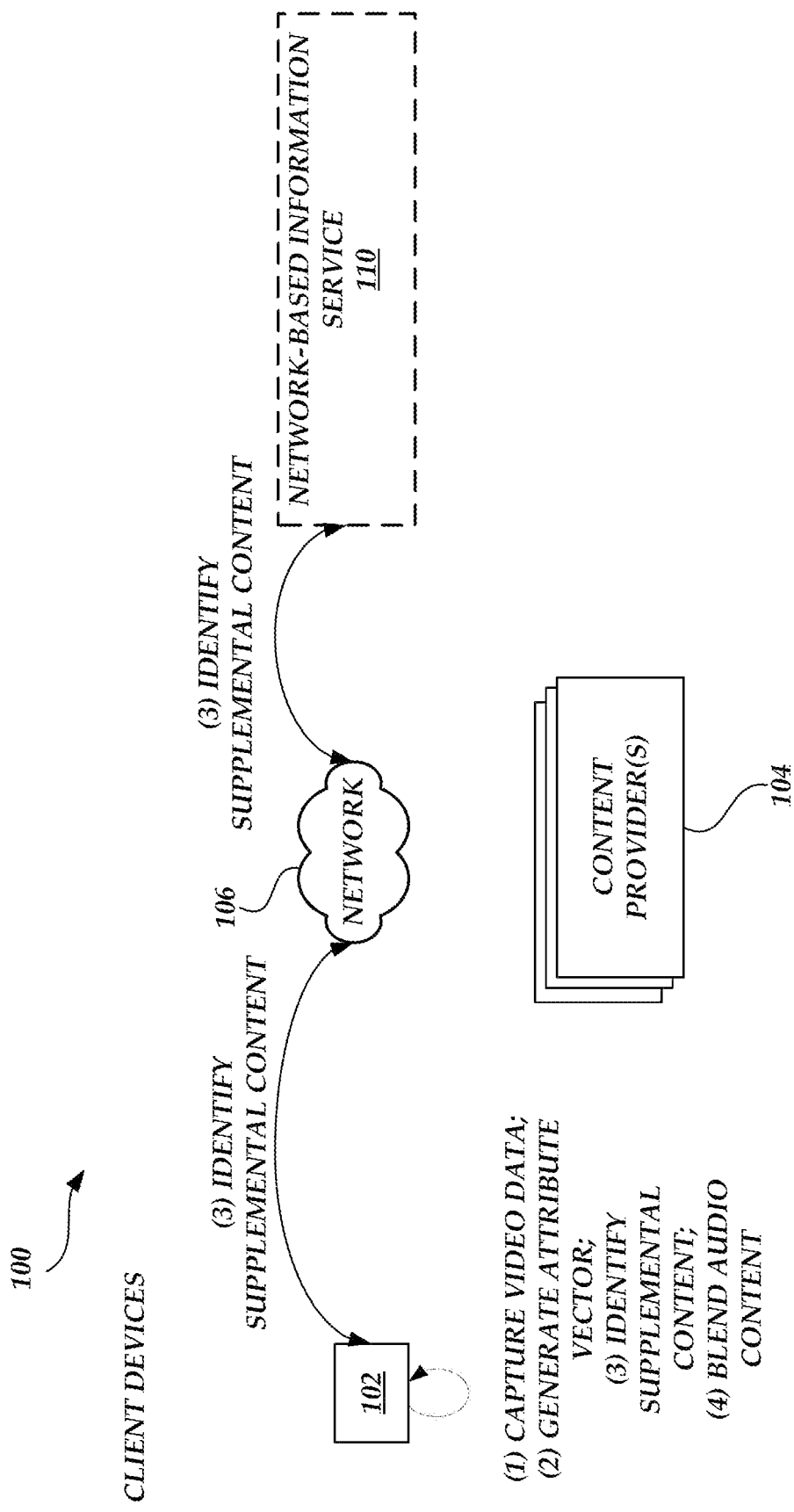
FIG. 3 is a block diagram of the system FIG. 1 illustrating various instructions of providing instructions to the client computing device and processing of the instructions by the client computing device.

Turning now to FIG. 3, illustrative interactions of the components of the system 100 will be described. As previously described, the actions depicted in FIG. 3 are based on on a client accessing a client computing device 102 to generate video frame data, such as accessing a video gaming application, social media application, and the like. Additionally, for purpose of the present application, it is assumed that the supplemental content application (e.g., an audio supplemental content application) has been configured with one or more machine learned algorithms for processing video content and selecting audio content as discussed herein.

At (1), the supplemental content application captures one or more frames of video data being generated by the one or more content generation application. As previously described, the supplemental content application can leverage various video-capture technologies to capture a few frames of a video. The capture of the video frame data may be configured according to some capture frequency, which can be dynamic in nature. For example, the capture frequency may be based on historical information, such as typical changes in scenes or length of video content. In other embodiments, the dynamic frequency can be based on the pace or determined dynamics of the objects depicted in the video content data.

At (2), the supplemental content application processes the captured video frame data to generate an attribute vector. Illustratively, the supplemental audio content generation application estimates the musical theme from the video scene and fits the captured frame to the offline level maps. For example, the supplemental content application can extract set of features in each frame group (optionally using convolutional neural network), and finally build a hierarchical similarity cluster (ex HDBSCAN) across previously process video files. As previously discussed, In some embodiments, in addition to characterization of action, the video analysis application can also characterize health of characters, pace of play, style of play (e.g., aggressive, conservative, etc.), and intent of game play (e.g., high score, level of play, general play, etc.). In this regard, the machine learned algorithm may be trained in a manner that allows for the processing of individual frames of data to generate the resulting characterizations. Accordingly, each individual game may have different configurations (e.g., machine learned algorithms) based on the visual outputs generated by each game. Illustratively, the processing result can include these attributes for use in the selection of supplemental content.

In sill other embodiments, the video game content may not necessarily include character play. The video analysis application can provide processing results identifying mood or theme as described above. Additionally, the video analysis application can also identify objects in the video game content that can provide references points. For example, a word game application may have a puzzle board as a display object that can be processed for characterizing play of the word game application. In another example, a drawing application may include drawing tools or a "canvas" as display objects. As described above, in some application, the processing results can be based on display attributes (e.g., color, changes in appearance, fonts, location, etc.) that correspond to inputs for supplemental content selection (e.g., frequency, adaptation attributes, pace, etc.).

Still further, in some embodiment, the video analysis application can also be trained to filter or ignore aspects of the video feed. For example, a gaming application may have a core set of display objects for game play that are combined with background images or display objects. The background images or display objects may be dynamically changed, such as according to level of play or to correspond to periodic updates for the game (e.g., a holiday version). The machine learned algorithms can be trained illustratively so that the impact of dynamic display objects in the generation of processing results are ignored or reduced.

At (3), the supplemental audio content generation application processes the generated attribute vector to identify at least one audio segment based on a machine-learned algorithm. Illustratively, the supplemental audio content generation application uses the musical theme from the video scene and fits the captured frame to the offline level maps. The supplemental audio content generation application can process the attributes to local supplemental content generation service and identify target audio segments. In some embodiments, the local supplemental content generation service would take the additional step to split audio-FX from the music, creating two audio streams, and optionally reconstructing the audio-FX stream to remove audible artifacts due to splitting a single stream into two streams. This technic might have additional value even for the more common case of independent controls to mute audio-FX vs in-game music, where the original in-game music could be used to ascertain deeper insight in the current goings in the game. The network service 110 can also provide some matching information in some embodiments.

In some embodiments, the supplemental audio generation application can adapt audio segment information based on the generated attribute vector as inputs. Illustratively, as described previously, The processing results can be then processed to make intelligent decisions to influence supplemental content (e.g., song selection) and the adaptation of a song to the current game scene. Such adaptions can include selection among variations of a song, selection of playback speed, configuring combination of songs, identifying fade in or fade out rates, and the like. In some embodiments, the selection of the supplemental content may be provided by a separate application. This separate application may utilize additional machine learned algorithms that utilize the processing result from the analysis of video game feed as input. Such separate applications may be configured with user profile information or otherwise customized to individual preferences.

To achieve the adaptation, an offline process for adaptation of audio tracks may be embodied in a machine learned algorithm. The offline process incorporates abstract models from existing instrument and/or vocal sounds (singing voice, lyrics), with the goal to produce new "musical" content that is true to the original sound. Using the built abstract models from musical scores, the audio (as in the audio of a song), and the appropriate genre, with the goal of using the abstraction to augment, modify, and extend the creativity of the original artist within the boundaries of the style of the artists and the genre. Additionally, the built models based on the creative and expressive style of an artist with the goal of mimicking the style when creating new content true to the style of the original artist. In a sense, the system will capture the creative-style such that it becomes an engine to create more content in the same style.

At (4), the supplemental content application sends or blends the supplemental content generation-audio-device for mixing.

Figure 4:
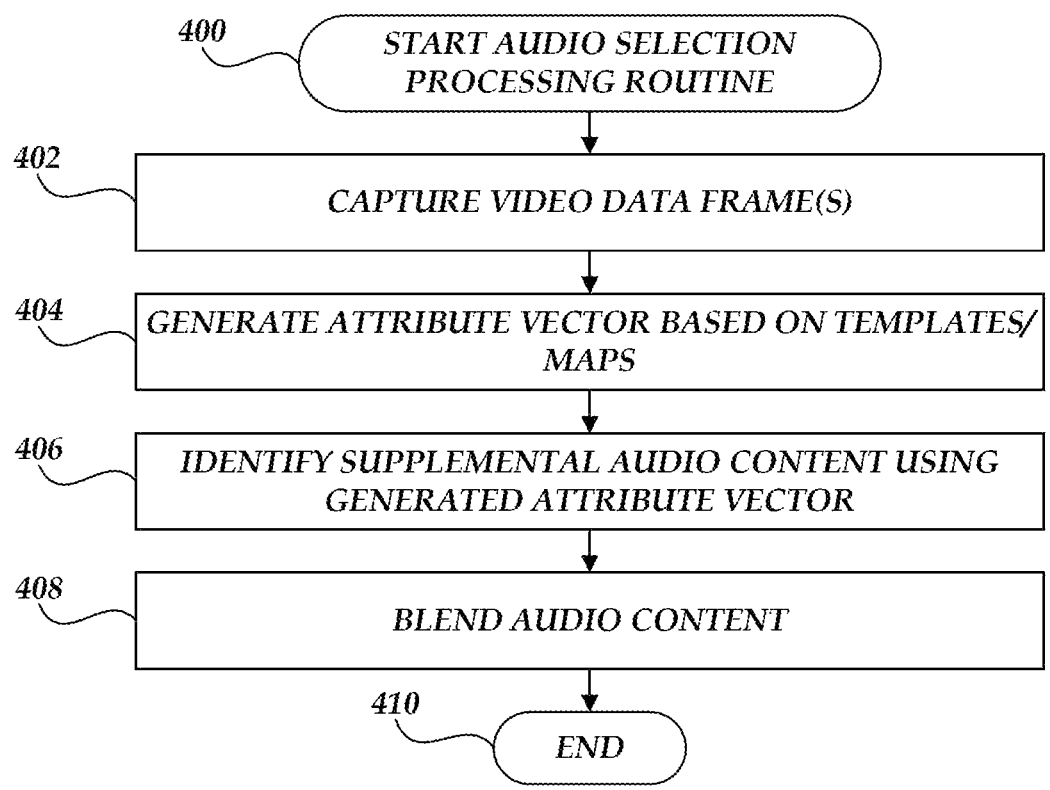
FIG. 4 is a flow diagram illustrative of a routine for the selection of supplemental audio data.

Turning now to FIG. 4, a routine for the selection of audio content will be described. As previously described, the actions depicted in routine 400 are based on on a client accessing a client computing device 102 to generate video frame data, such as accessing a video gaming application, social media application, and the like. Additionally, for purposes of the present application, it is assumed that the supplemental content application (e.g., an audio supplemental content application) has been configured with one or more machine learned algorithms for processing video content and selecting audio content as discussed herein.

At block 402, the supplemental content application captures one or more frames of video data being generated by the one or more content generation application. As previously described, the supplemental content application can leverage various video-capture technologies to capture a few frames of a video. The capture of the video frame data may be configured according to some capture frequency, which can be dynamic in nature. For example, the capture frequency may be based on historical information, such as typical changes in scenes or length of video content. In other embodiments, the dynamic frequency can be based on the pace or determined dynamics of the objects depicted in the video content data.

At 404, the supplemental content application processes the captured video frame data to generate an attribute vector. Illustratively, the supplemental audio content generation application estimates the musical theme from the video scene and fits the captured frame to the offline level maps. For example, the supplemental content application can extract set of features in each frame group (optionally using convolutional neural network), and finally build a hierarchical similarity cluster (ex HDBSCAN) across previously process video files. As previously discussed, In some embodiments, in addition to characterization of action, the video analysis application can also characterize health of characters, pace of play, style of play (e.g., aggressive, conservative, etc.), and intent of game play (e.g., high score, level of play, general play, etc.). In this regard, the machine learned algorithm may be trained in a manner that allows for the processing of individual frames of data to generate the resulting characterizations. Accordingly, each individual game may have different configurations (e.g., machine learned algorithms) based on the visual outputs generated by each game. Illustratively, the processing result can include these attributes for use in the selection of supplemental content.

In sill other embodiments, the video game content may not necessarily include character play. The video analysis application can provide processing results identifying mood or theme as described above. Additionally, the video analysis application can also identify objects in the video game content that can provide references points. For example, a word game application may have a puzzle board as a display object that can be processed for characterizing play of the word game application. In another example, a drawing application may include drawing tools or a "canvas" as display objects. As described above, in some application, the processing results can be based on display attributes (e.g., color, changes in appearance, fonts, location, etc.) that correspond to inputs for supplemental content selection (e.g., frequency, adaptation attributes, pace, etc.).

Still further, in some embodiment, the video analysis application can also be trained to filter or ignore aspects of the video feed. For example, a gaming application may have a core set of display objects for game play that are combined with background images or display objects. The background images or display objects may be dynamically changed, such as according to level of play or to correspond to periodic updates for the game (e.g., a holiday version). The machine learned algorithms can be trained illustratively so that the impact of dynamic display objects in the generation of processing results are ignored or reduced.

At block 406, the supplemental audio content generation application processes the generated attribute vector to identify at least one audio segment based on a machine-learned algorithm. Illustratively, the supplemental audio content generation application uses the musical theme from the video scene and fits the captured frame to the offline level maps. The supplemental audio content generation application can process the attributes to local supplemental content generation service and identify target audio segments. In some embodiments, the local supplemental content generation service would take the additional step to split audio-FX from the music, creating two audio streams, and optionally reconstructing the audio-FX stream to remove audible artifacts due to splitting a single stream into two streams. Illustratively, the supplemental content generation application can use natural language processing (NLP) to match abstract, non-musical words with the generated attribute vector. In other embodiments, the supplemental content generation application can also made individual objects depicted in the captured video frame data. Additionally, the selection of the audio segment can correspond to different portions of the audio track information, such as chorus, riffs, hooks, etc. that may closely match with the generated attributed vector.

In some embodiments, the supplemental audio generation application can adapt audio segment information based on the generated attribute vector as inputs. Illustratively, as described previously, the processing results can be then processed to make intelligent decisions to influence supplemental content (e.g., song selection) and the adaptation of a song to the current game scene. Such adaptions can include selection among variations of a song, selection of playback speed, configuring combination of songs, identifying fade in or fade out rates, and the like. In some embodiments, the selection of the supplemental content may be provided by a separate application. This separate application may utilize additional machine learned algorithms that utilize the processing result from the analysis of video game feed as input. Such separate applications may be configured with user profile information or otherwise customized to individual preferences.

To achieve the adaptation, an offline process for adaptation of audio tracks may be embodied in a machine learned algorithm. The offline process incorporates abstract models from existing instrument and/or vocal sounds (singing voice, lyrics), with the goal to produce new "musical" content that is true to the original sound. Using the built abstract models from musical scores, the audio (as in the audio of a song), and the appropriate genre, with the goal of using the abstraction to augment, modify, and extend the creativity of the original artist within the boundaries of the style of the artists and the genre. Additionally, the built models based on the creative and expressive style of an artist with the goal of mimicking the style when creating new content true to the style of the original artist. In a sense, the system will capture the creative-style such that it becomes an engine to create more content in the same style.

At block 408, the supplemental content application sends or blends the supplemental content generation-audio-device for mixing. Routine 400 terminates at block 410.

Figure 5:
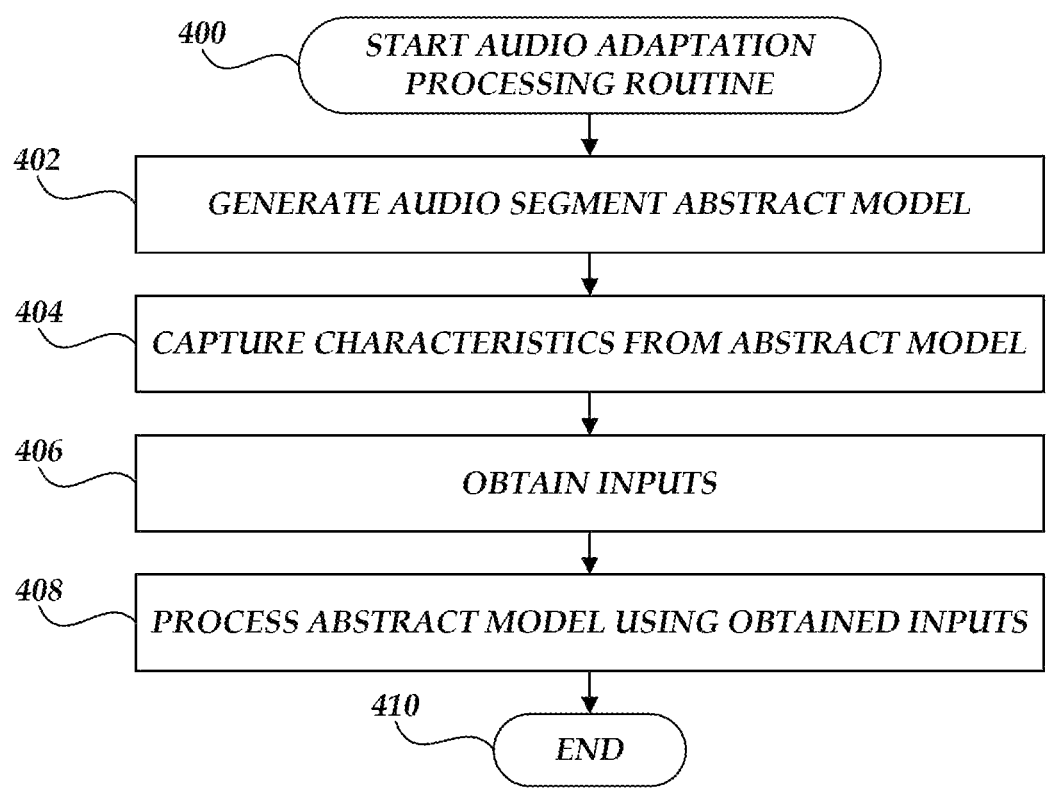
FIG. 5 is a flow diagram illustrative of a routine for generation of adapted audio track information.

FIG. 5 illustrates a routine 500 depicting an audio adaption routine implemented by one or more machine learned algorithms implementing an offline process. At block 502, the offline process incorporates abstract models from existing instrument and/or vocal sounds (singing voice, lyrics). Illustratively, the abstract models are configured to produce new "musical" content that is true to the original sound.

At block 504, using the built abstract models from musical scores, the audio (as in the audio of a song), and the appropriate genre, with the goal of using the abstraction to augment, modify, and extend the creativity of the original artist within the boundaries of the style of the artists and the genre. Additionally, the built models based on the creative and expressive style of an artist with the goal of mimicking the style when creating new content true to the style of the original artist. In a sense, the system will capture the creative-style such that it becomes an engine to create more content in the same style. The resulting characterizations may be generated as processing results such as to characterize audio information. For example, the characterizations can include genre, sub-genre, mood, and character. Additionally, attributes of the audio segments can include tempo, key, mode, chords, melody.

At block 506, the content generation application obtains inputs for adaption, such as preference information, generated attribute vectors and the like, that function as inputs to the abstract models. At block 508, the content generation application generates the adaptions using machine learning models. Additionally, the engagement platform can further process portions of the segments used for reconciliation or attribution.

At block 510, the routine 510 terminates.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be fully automated via software code modules, including one or more specific computer-executable instructions executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of external computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable external computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code that include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A method for generating supplemental content utilizing supplemental audio content generation application decoupled from one or more video game content generating application, the method comprising:

capturing, by the supplemental audio content generation application, one or more video frames from video content data to be rendered by a client device and generated by the one or more video game content generating applications, wherein the supplemental audio content generation application and the one or more video game content generating applications as executed on a client device, and wherein the supplemental audio content generation application and the one or more video game content generating applications are decoupled and independently executable;

independently processing, by the supplemental audio content generation application, content depicted in the captured one or more video frames to generate an attribute vector characterizing content depicted in the captured one or more video frames, without input from the one or more video game content generating application;

processing, by the supplemental audio content generation application, the generated attribute vector of the captured one or more video frames to identify at least one audio segment based on a machine-learned algorithm; and causing, by the supplemental audio content generation application, a playback of the identified at least one audio segment by the client device in conjunction with the video frames provided by the one or more video game content generating applications and rendered by the client device.

2. The method of claim 1, wherein one or more video game content generating applications include at least one social media application generating video frame data.

3. The method of claim 1, wherein one or more video game content generating applications include at least one video gaming application generating video frame data.

4. The method of claim 1, wherein obtaining, by the supplemental audio content generation application, one or more video frames generated by the one or more video game content generating applications includes obtaining individual frames of video data based on a capture frequency.

5. The method of claim 1, wherein the attribute vector characterizing content depicted in the one or more video frames includes one or more attributes corresponding to a characterization of a theme of objects depicted in the video frame data.

6. The method of claim 1, wherein the attribute vector characterizing content depicted in the one or more video frames includes one or more attributes corresponding to characterization of a measured progress of objects depicted in the video frame data.

7. The method of claim 1, wherein the attribute vector characterizing content depicted in the one or more video frames includes one or more attributes corresponding to the characterization of mood of objects depicted in the video frame data.

8. The method of claim 1, wherein the attribute vector characterizing content depicted in the one or more video frames includes one or more attributes corresponding to characterization of a pace of objects depicted in the video frame data.

9. The method of claim 1, wherein the attribute vector characterizing content depicted in the one or more video frames includes one or more attributes corresponding to characterization of at least one of a style of play or intent of play in video gaming.

10. The method of claim 1 wherein processing, by the supplemental audio content generation application, the generated attribute vector to identify at least one audio segment based on a machine-learned algorithm includes identifying a segment of an audio track correlated to the generated attribute vector.

11. The method of claim 1, wherein processing, by the supplemental audio content generation application, the generated attribute vector to identify at least one audio segment based on a machine-learned algorithm includes adapting at least one target segment based on the generated attribute vector.

12. The method of claim 1, wherein adapting at least one target segment based on the generated attribute vector includes adapting a speed of play.

13. The method of claim 1, wherein adapting at least one target segment based on the generated attribute vector includes adapting fade information.

14. The method of claim 1, wherein adapting at least one target segment based on the generated attribute vector includes combining two or more audio segments.

15. The method of claim 1, wherein adapting at least one target segment based on the generated attribute vector includes generating new audio tracks based on the generated attribute vector and preference information.

16. The method of claim 4, wherein the capture frequency is dynamically modified based on attributes of the video frame data.

17. A system to supplemental audio content comprising:
one or more computing processors and memories associated with a supplemental audio content generation application, wherein the supplemental audio content generation application is executed on a client device and wherein the supplemental audio content generation application, and one or more video game content generating applications are independently executable, wherein the supplemental audio content generation application is configured to:
capture one or more video frames for rendering on a client device and generated by the one or more video game content generating applications, wherein the supplemental audio content generation application and the one or more video game content generating applications as executed on the client device and wherein the supplemental audio content generation application and the one or more video game content generating applications are decoupled and independently executable;
independently process content depicted in the captured one or more video frames to generate an attribute vector characterizing content depicted in the captured one or more video frames, without input from the one or more video game content generating application;
process the generated attribute vector to identify at least one audio segment based on a machine-learned algorithm, wherein the identified at least one audio segment is adapted based, at least in part, on the generated attribute vector; and
cause a playback of the identified at least one audio segment by the client device in conjunction with the video frames provided by the one or more video game content generating applications and rendered on the client device.

18. The system of claim 17, wherein the supplemental audio content generation application obtains individual frames of video data based on a capture frequency.

19. The system of claim 17, wherein the attribute vector characterizing content depicted in the one or more video frames includes one or more attributes corresponding to a characterization of at least one of a theme of objects depicted in the one or more video frames; a measured progress of objects depicted in the one or more video frames; mood of objects depicted in the one or more video frames; pace of objects depicted in the one or more video frames; or a style of play or intent of play in video gaming.

20. The system of claim 17, wherein the supplemental content application adapts at least one target segment based on the generated attribute vector based on at least one of adapting a speed of play; adapting fade information; combining two or more audio segments; or generating new audio tracks based on the generated attribute vector and preference information.

21. A method for generating supplemental content utilizing supplemental audio content generation application decoupled from one or more video game content generating application, the method comprising:
capturing, by the supplemental audio content generation application, one or more video frames generated by the one or more video game content generating applications for rendering on a client device, wherein the supplemental audio content generation application and the one or more video game content generating applications as executed on the client device, and wherein the supplemental audio content generation application and the one or more video game content generating applications are decoupled and independently executable;
independently processing, by the supplemental audio content generation application, content depicted in the captured one or more video frames to generate an attribute vector characterizing content depicted in the one or more video frames, without input from the one or more video game content generating application;
processing, by the supplemental audio content generation application, the generated attribute vector to identify at least one audio segment based on a machine-learned algorithm, wherein the identified at least one audio segment is adapted based, at least in part, on the generated attribute vector; and
causing, by the supplemental audio content generation application, a playback of the identified at least one audio segment by the client device in conjunction with the video frames provided by the one or more video content generating applications and rendered on the client device.

22. The method of claim 21, wherein obtaining, by the supplemental audio content generation application, one or more video frames generated by the one or more video game content generating application includes obtaining individual frames of video data based on a capture frequency.

23. The method of claim 21, wherein the attribute vector characterizing content depicted in the one or more video frames includes one or more attributes corresponding to a characterization of at least one of a theme of objects depicted in the one or more video frames; a measured progress of objects depicted in the video frames; mood of objects depicted in the one or more video frames; pace of objects depicted in the one or more video frames; or a style of play or intent of play in video gaming.

24. The method of claim 21, wherein the supplemental content application adapts at least one target segment based on the generated attribute vector based on at least one of adapting a speed of play; adapting fade information; combining two or more audio segments; or generating new audio tracks based on the generated attribute vector and preference information.

\* \* \* \* \*